United States Patent [19]
Pritchard et al.

[11] Patent Number: 6,054,704
[45] Date of Patent: Apr. 25, 2000

[54] DRIVEN CAPACITOR STORAGE PIXEL SENSOR AND ARRAY

[75] Inventors: J. Orion Pritchard, San Francisco; Richard B. Merrill, Woodside; Richard F. Lyon, Los Altos, all of Calif.

[73] Assignee: Foveon, Inc., Santa Clara, Calif.

[21] Appl. No.: 09/108,110

[22] Filed: Jun. 30, 1998

[51] Int. Cl.[7] ...................................................... H04N 3/14
[52] U.S. Cl. .................................. 250/208.1; 250/214 R; 348/302
[58] Field of Search ........................... 250/208.1, 214 R; 348/294, 300–302, 308, 311

[56] References Cited

U.S. PATENT DOCUMENTS

| | | | |
|---|---|---|---|
| 3,988,619 | 10/1976 | Malaviya et al. | 307/311 |
| 4,002,824 | 1/1977 | Petrocelli et al. | 358/108 |
| 4,654,714 | 3/1987 | Hurst, Jr. et al. | 358/213 |
| 4,809,075 | 2/1989 | Akimoto et al. | 358/213 |
| 4,839,735 | 6/1989 | Kyomasu et al. | 358/213.31 |
| 4,942,473 | 7/1990 | Zeevi et al. | 358/213.26 |
| 5,262,871 | 11/1993 | Wilder et al. | 358/213.11 |
| 5,428,390 | 6/1995 | Cooper et al. | 348/240 |
| 5,471,245 | 11/1995 | Cooper et al. | 348/302 |
| 5,541,402 | 7/1996 | Acklane et al. | 250/208.1 |
| 5,576,763 | 11/1996 | Acklane et al. | 348/308 |
| 5,631,704 | 5/1997 | Dickinson et al. | 348/308 |
| 5,739,562 | 4/1998 | Ackland et al. | 257/291 |

FOREIGN PATENT DOCUMENTS

| 0777379 | 6/1997 | European Pat. Off. | H04N 3/15 |
|---|---|---|---|

OTHER PUBLICATIONS

R. Panicacci, et al. 1/4–Inch CMOS Active Pixel Sensor with Smart on–Chip Functions and Full Digital Interface, Aug. 25–26, 1997 pp: 41–53, Hot Chips IX, Stanford California.

S. Decker, et al. A 256×256 CMOS Imaging Array with Wide Dynamic Range Pixels and Column–Parallel Digital Output, 1998 IEEE International Solid–State Circuits Conference; pp: 176–177.

Tobi Delbruck, et al. Analog VLSI Adaptive, Logarithmic, Wide–Dynamic–Range Photoreceptor, IEEE London, May 1994, Dept. Of Computation and Neural Systems California Institute of Technology Pasadena, CA.

T. Delbruck, et al. Analog VLSI Phototransduction by continuous–time, adaptive, logarithmic photoreceptor circuits, Apr. 2, 1996, CNS Memo No. 30, cover, pp: 1–23, index.

Eric R. Fossum, Active Pixel Sensors: Are CCD's Dinosaure?, Jet Propulsion Laboratory, California Institute of Technology, 2/SPIE vol. 1900. pp. 2–14.

Sunetra K. Mendis, et al. A 128×128 CMOS Active Pixel Image Sensor for Highly Intergrated Imaging Systems, 1993 IEEE, IEDM 93–583, pp. 22.6.1–66.6.4.

Yoshiaki Hagiwara, Member IEEE, High–Density and High–Quality Frame Transfer CCD Imager with Very Low Smear, Low Dark Current, and Very High Blue Senitivity, 1996 IEEE, IEEE Transaction of Electron Devices, vol. 43 No. 12, Dec. 1996, pp. 2122–2130.

(List continued on next page.)

*Primary Examiner*—Stephone B. Allen
*Attorney, Agent, or Firm*—Sierra Patent Group. Ltd.

[57] ABSTRACT

A storage pixel sensor comprises a photosensor selectively connectable to a reset potential; a switched buffer amplifier having a control terminal coupled to said photosensor, a first terminal connected to a source of a transfer signal, and a second terminal; a storage capacitor coupled to said second terminal of said switched buffer amplifier; and an amplifier coupled to said storage capacitor.

29 Claims, 7 Drawing Sheets

OTHER PUBLICATIONS

Alex Dickinson, et al. A 256×256 CMOS Active Pixel Image Sensor with Motion Detection, 1995 IEEE International Solid–State Circuits Conference, pp. 226–227.

Orly Yadid–Pecht, et al., A Random Access Photodiode Array for Intelligent Image Capture, IEEE Transactions of Electron Devices, vol. 38, No. 8, Aug. 1991, pp. 1772–1780.

Tatsuo Nomoto, et al. A 4M–Pixel CMD Image Sensor with Block and Skip Access Capability, 1997 IEEE International Solid–State Circuits Conference, pp. 186–7, 142–3, 398, 465.

Hon–Sum Philip Wong, CMOS Active Pixel Image Sensors Fabricated Using a 1.8V, 0.25–um CMOS Technology, IEEE Transaction of Electron Devices, vol. 45, No. 4, Apr. 1998, pp. 889–894.

R. Daniel McGrath, et al. Current–Mediated, Current Reset 786×512 Active Pixel Sensor Array, 1997 IEEE International Solid–State Circuits Conference, pp. 183–182–3, 1997 ISSCC Slide Supplement/IEEE pp. 138–139.

Carver A. Mead, et al. Scanners for Visualizing Activity or Analog VLSI Circuitry, California Institute of Technology Computation and Neural Systems Program, Jul. 5, 1991, CNS Memo 11, pp: 1–29.

Steven J. Decker., A Wide Dynamic Range CMOS Imager with Parallel On–Chip Analog–to–Digital Converson, Massachusetts Institute of Technology, Sep. 1997, pp. 1–205.

Chye Huat Aw, et al. "A 128×128–Pixel Standard CMOS Image Sensor with Electronic Shutter" IEEE International Solid State Circuits Conference vol. 39, pp 180–181, 440 Feb. 1996.

DRIVEN CAPACITOR STORAGE PIXEL SENSOR AND ARRAY

BACKGROUND OF THE INVENTION

1. Field of the Invention

The present invention relates to image sensor arrays. More particularly, the present invention relates to CMOS storage pixel sensors and arrays for applications such as still cameras and to methods for operating those sensors and arrays.

2. The Prior Art

Integrated image sensors are known in the art. Such sensors have been fabricated from charge-coupled devices (CCDs) and as bipolar and MOS image sensors.

Storage pixel sensors formed from MOS devices are known in the art. MOS storage pixel sensors employ capacitive storage elements. One such storage pixel sensor and array is disclosed in co-pending application Ser. No. 08/969,383, filed Nov. 13, 1997, entitled INTRA-PIXEL FRAME STORAGE ELEMENT, ARRAY, AND ELECTRONIC SHUTTER METHOD SUITABLE FOR ELECTRONIC STILL CAMERA APPLICATIONS, assigned to the same assignee as the present invention.

It is a delicate task to select a satisfactory capacitor value for MOS storage pixel sensors. For good photocharge to voltage gain in the storage pixel sensor, it is desirable to employ a small capacitance. If the capacitor value is too small, however, the storage time of the pixel sensor suffers because the voltage on the small storage capacitance is easily subject to change by mechanisms such as dark current. For good storage integrity, it is desirable to employ a larger capacitor. If the capacitor value is too large, however, the photocharge generated by the photosensor element in the pixel sensor does not cause much of a voltage change on the capacitor during integration of photocharge.

It is therefore an object of the present invention to provide a storage pixel sensor and an array of pixel sensors that overcome some of the shortcomings of the prior art.

A further object of the present invention is to provide a storage-pixel sensor and an imaging array of storage-pixel sensors that provides good photocharge-to-voltage gain.

Another object of the present invention is to provide a storage-pixel sensor and an imaging array of storage-pixel sensors that provides good voltage stability during a storage period.

Yet other object of the present invention is to provide a storage-pixel sensor and an imaging array of storage-pixel sensors that provides good photocharge-to-voltage gain and that provides good voltage stability during a storage period.

BRIEF DESCRIPTION OF THE INVENTION

According to one aspect of the present invention, a storage-pixel sensor with driven capacitor storage and an array of storage-pixel sensors with driven capacitor storage suitable for use in an active-pixel area-array image sensor employing an electronic shutter method are disclosed.

According to a presently preferred embodiment, the storage pixel sensor of the present invention comprises a photodiode coupled to a reset potential via a reset switch. A source follower transistor has its gate coupled to the photodiode, its source connected to a storage capacitor and its drain connected to a control line. The control line has a first voltage during an integration state and a second voltage during a storage state. An amplifier has an input connected to the common connection of the storage capacitor and the source of the source follower transistor and an output that may be connected to a column output line of an array of storage pixel sensors via a select device.

DETAILED DESCRIPTION OF THE PREFERRED EMBODIMENT

Those of ordinary skill in the art will realize that the following description of the present invention is illustrative only and not in any way limiting. Other embodiments of the invention will readily suggest themselves to such skilled persons.

Figure 1:
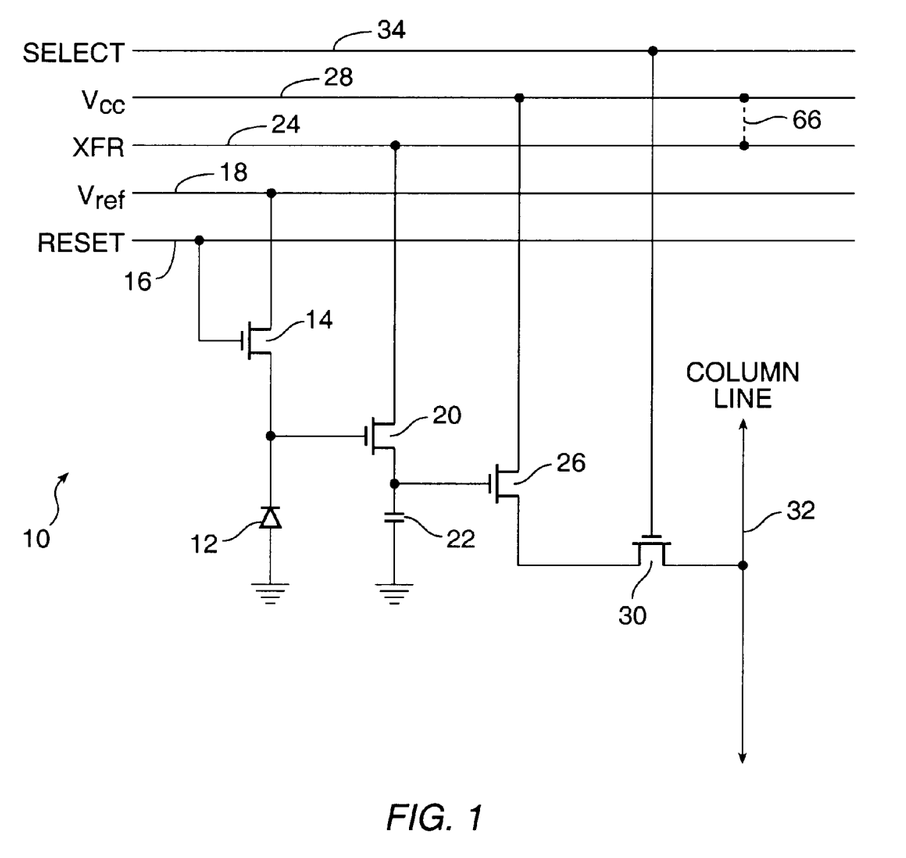
FIG. 1 is a simplified schematic diagram of a storage-pixel sensor according to the present invention.

Referring first to FIG. 1, a schematic diagram shows storage pixel sensor 10 according to a presently preferred embodiment of the invention. It is contemplated that storage pixel sensor 10 will be disposed in an array of storage pixels, and FIG. 1 illustrates how storage pixel sensor 10 will be connected in an array environment.

A photodiode 12, serving as the photosensor of pixel sensor 10, has its anode connected to a fixed potential, shown as ground in FIG. 1, and its cathode connected to the source of N-Channel MOS reset transistor 14 serving as a reset switch. The gate of N-Channel MOS reset transistor 14 is connected to RESET control line 16 and its drain is connected to Vref line 18. The voltage Vref will typically be between about 1 and about 3 volts.

An N-Channel MOS switched buffer amplifier transistor 20, serving as a transfer switch, has its gate connected to the cathode of photodiode 12, its source connected to a first plate of a storage capacitor 22 and its drain connected to a XFR control line 24. The other plate of storage capacitor 22 is connected to a fixed potential shown as ground in FIG. 1.

An amplifier comprising N-Channel MOS amplifier transistor 26, connected as a source follower, has its gate connected to the common connection of the first plate of storage capacitor 22 and the source of N-Channel MOS transfer transistor 20, and its drain connected to Vcc line 28. An N-Channel MOS select transistor is connected between the source of N-Channel MOS amplifier transistor 26 and column output line 32 of the array containing the storage pixel sensor 10. The gate of N-Channel MOS select transistor 30 is connected to row SELECT line 34.

Figure 2:
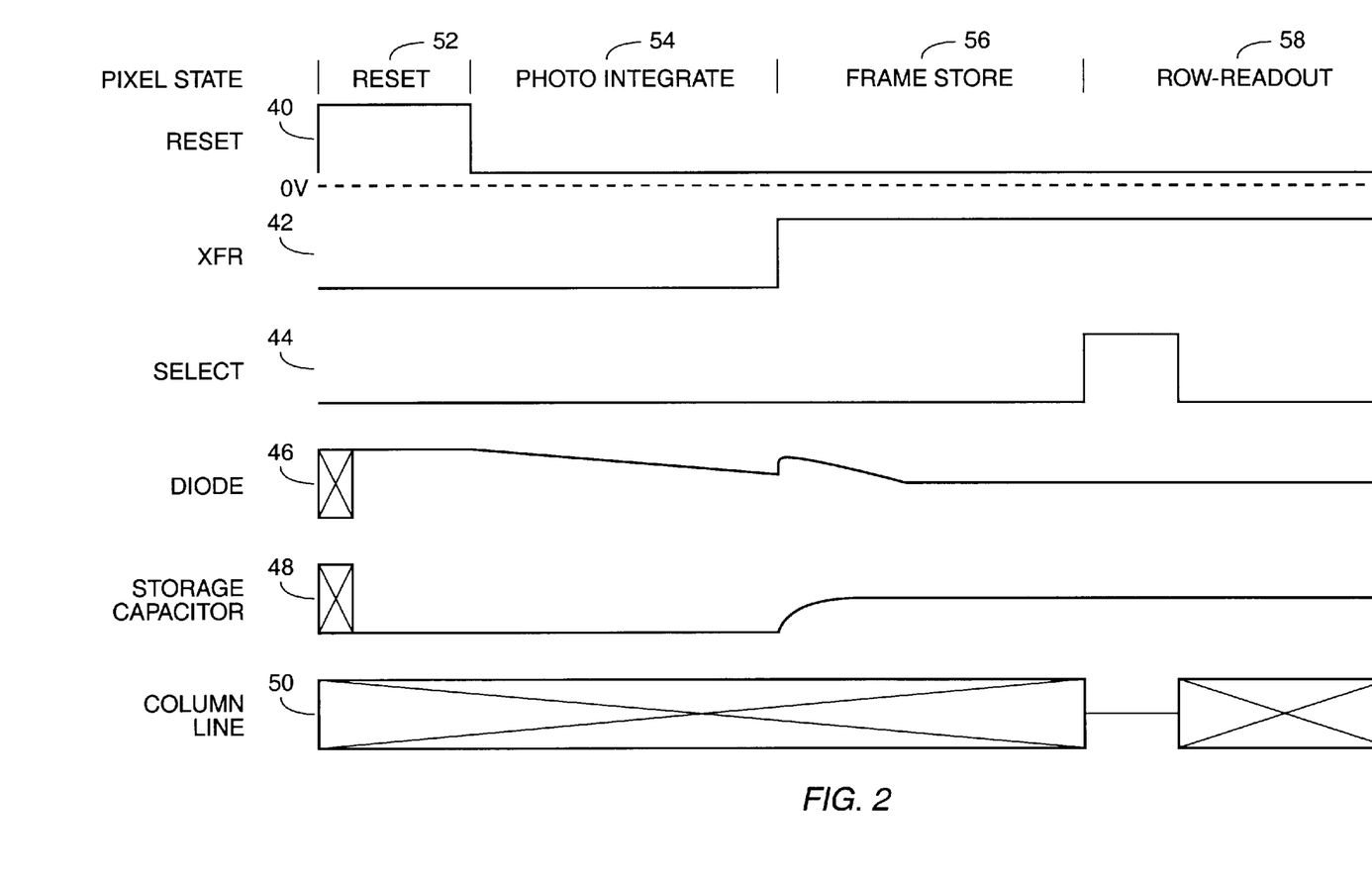
FIG. 2 is a timing diagram showing a first method for the operation of the storage-pixel sensor of FIG. 1.

Referring now to FIG. 2, a timing diagram shows the control voltages asserted to and the resulting signal voltages present in the storage pixel sensor 10 of FIG. 1 during the Reset period, Photo Integration period, Frame Store period, and Row-Readout period. The top three traces of FIG. 2 (reference numerals 40, 42, and 44, respectively) represent the RESET, XFR, and SELECT control signals applied to storage pixel 10 during its operation. The next three traces (reference numerals 46, 48, 50, respectively) represent the pixel data signals present at the cathode of the photodiode, the storage capacitor, and the column output line and show how these signals relate to the control signals asserted to the storage pixel sensor 10. The Reset period is indicated at reference numeral 52, the Photo Integration period is indicated at reference numeral 54, the Frame Store period is indicated at reference numeral 56, and the Row-Readout period is indicated at reference numeral 58. Persons of ordinary skill in the art will appreciate that the timing of the signals in FIG. 2 is intended to be relative and that accuracy of pulse duration is not intended in the figure.

The Reset period 52 begins when the RESET control signal goes high, turning on N-Channel MOS reset transistor 14, and ends when the RESET control signal again goes low, turning that device off. The RESET control signal is preferably common to all storage pixel sensors in an array. At the beginning of the Reset period 52, the voltage at the cathode of photodiode 12 (trace 46) is forced to Vref. In addition, because the drain of the switched buffer amplifier transistor 20 is low and its gate is at Vref, storage capacitor 22 is discharged to approximately the voltage at the drain of switched buffer amplifier transistor 20. Persons of ordinary skill in the art will appreciate that, during the reset operation, the terminal of switched buffer amplifier transistor 20 referred to herein as the "drain" actually acts as the source of the switched buffer amplifier transistor 20. For consistency in the specification and claims herein, this terminal will be referred to as the drain of the switched buffer amplifier transistor 20.

The Photo Integration period 54 begins when the RESET signal goes low, allowing the voltage at the cathode of the photodiode (trace 46) to drop as a result of accumulation of negative photocharge. Because the photocharge is accumulating on the relatively small capacitance of the photodiode 12 and the gate of the N-Channel MOS transfer transistor 14, the voltage can drop an appreciable amount.

As is known in the art of pixel sensors using photodiodes and MOS reset transistors, the low level of the RESET signal 16 (trace 40) can be chosen to be a voltage near or above the threshold voltage of reset transistor 14, thereby establishing an overflow barrier that will divert excess photocharge to the Vref line and prevent the cathode of photodiode 12 from falling below a limiting potential known as an overflow level near or above ground, and thereby preventing blooming of excess photocharge into other nearby pixel sensors. Therefore, a preferable voltage for the low level of the RESET signal 16 is typically in the range of about 0.7 to about 1.5 Volts.

The Photo Integration period 54 ends and the Frame Store period 56 begins when the XFR signal (trace 42) goes high and pulls the drain of the source follower N-Channel MOS switched buffer amplifier transistor 20 up to a voltage level around that of Vref, preferably about equal to Vcc. This turns on the transfer transistor which charges storage capacitor 22 to approximately a threshold drop below the voltage on the cathode of photodiode 12 and the gate of the transfer transistor resulting from the accumulated photocharge. The XFR control signal is preferably common to all storage pixel sensors in an array.

The rising edge of the XFR control signal will cause some capacitive coupling back to the gate of switched buffer amplifier transistor 20 and the cathode of photodiode 12. Depending on the relative capacitances of the photodiode and the transfer transistor gate, the step up in the potential at the photodiode cathode may be significant, and due to a boostrapping effect there may be a corresponding improvement in the charge-to-voltage gain at the photodiode cathode, similar to that discussed in co-pending application, attorney Docket No. FOV-013.

As will be appreciated by persons of ordinary skill in the art, the voltage on the cathode of photodiode 12 continues to drop from additional photocharge accumulated after the XFR signal has gone high until the pixel sensor saturates sometime into the Frame Store period 56. As shown in trace 48 of FIG. 2, the voltage on the plate of the capacitor 22 at the source of switched buffer amplifier transistor 20 cannot follow the continuing drop of the photodiode cathode voltage and thus stays constant. The only other connection to the storage capacitor 22 is the gate of the N-Channel MOS amplifier transistor 26 which is ideally an infinite impedance. There is thus no current path to allow the charge on storage capacitor 22 to leak off and lower the stored voltage. The relatively large size of storage capacitor 22 will sustain the voltage stored thereon for a long Frame Store period despite any negligible leakages encountered in this node of the circuit.

As will be appreciated by persons of ordinary skill in the art, the photodiode of the storage pixel sensor of FIG. 1 cannot be returned to a reset state during the Frame Store period. In such a case, the raising of the photodiode cathode voltage to Vref would cause the voltage stored on storage capacitor 22 to follow upward and erase the data stored thereon.

The voltage on capacitor 22 will follow a log-time curve such that it will rise about 60 mV per decade of time that it is allowed to settle upward, if the voltage on the photodiode 12 remains constant, since the switched buffer amplifier transistor 20 is operating as a source follower with no bias current load. To cause the voltage on capacitor 22 to settle at a precise offset from the voltage on photodiode 12, it is preferable to make sure the source follower action charging the capacitor 22 stops at a definite time. Two additional operating methods to accomplish this termination of the transfer process in the pixel sensor of the present invention are disclosed herein.

Figure 3A:
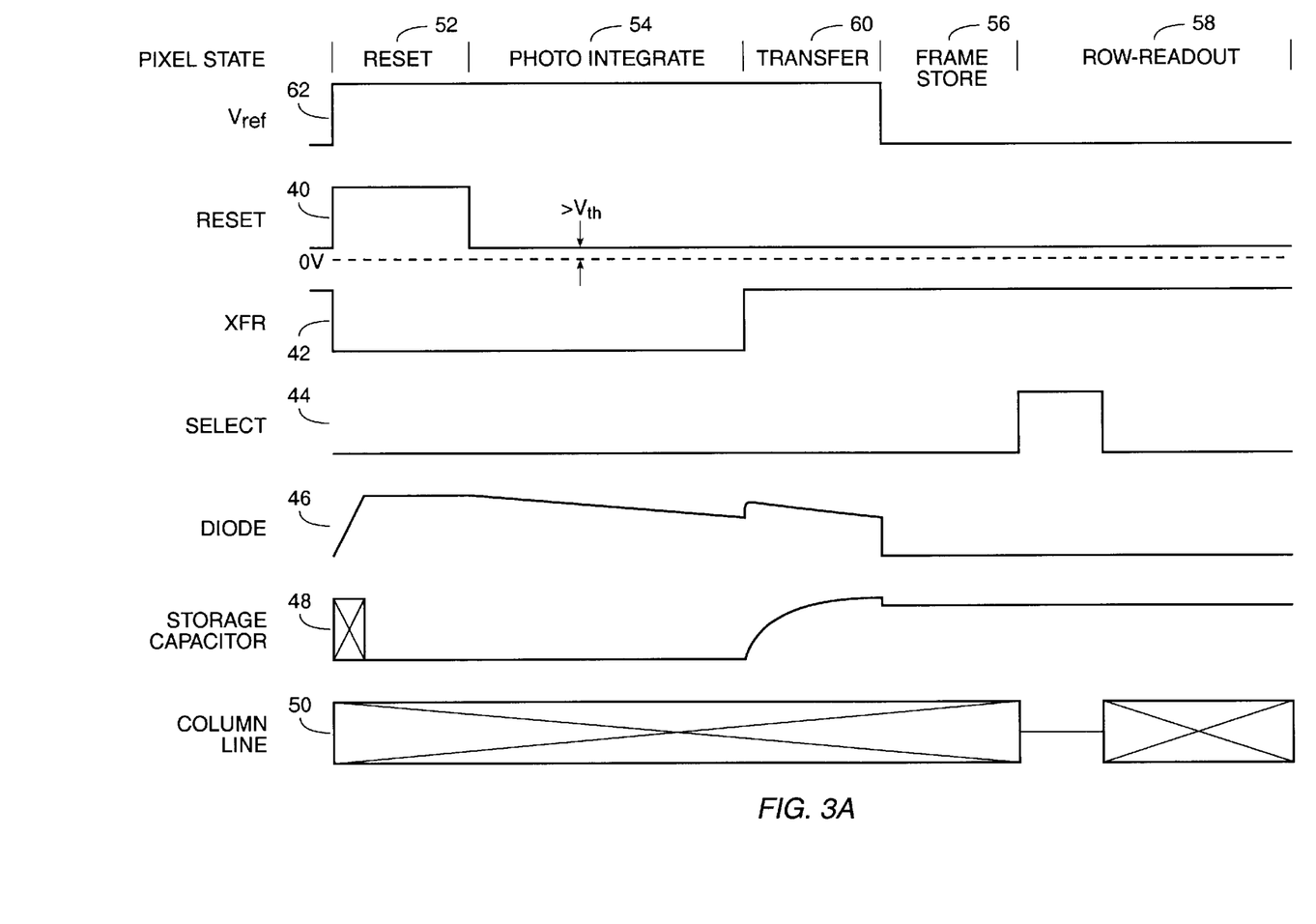
FIGS. 3a and 3b are timing diagrams showing two ways to implement a first method for the operation of the storage-pixel sensor of FIG. 1 including the step of terminating the transfer period.
Figure 3B:
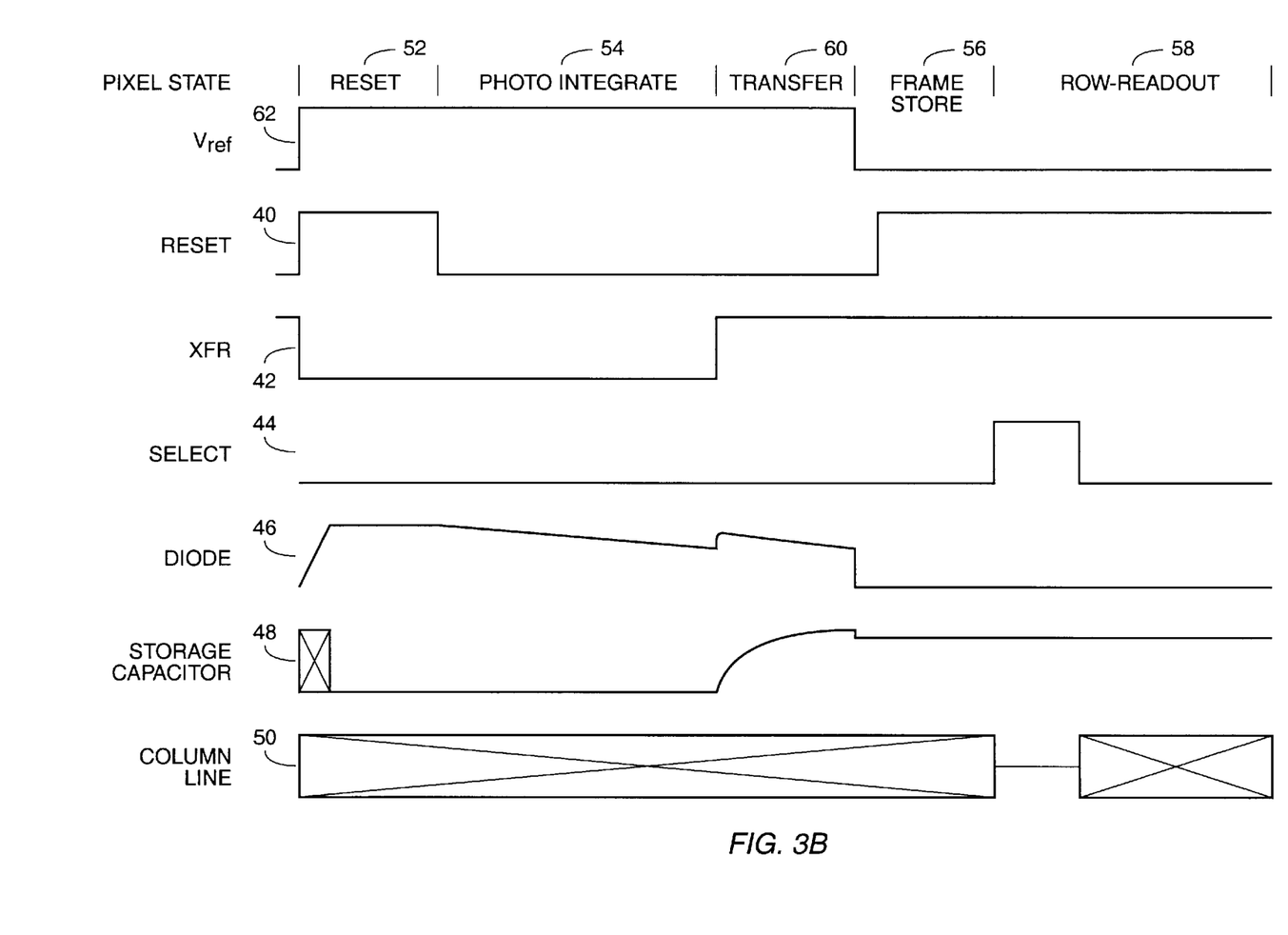

A first method for terminating the transfer process according to the present invention is illustrated in the timing diagrams of FIGS. 3*a* and 3*b*. As may be seen in FIGS. 3*a* and 3*b,* a discrete Transfer period 60 is identified in addition to Reset period 52, Photo-integrate period 54, Frame Store period 56, and Row-Readout period 58.

According to this method of operating the pixel sensor of the present invention, the gate of source follower switched buffer amplifier transistor 20 is pulled downward via the reset transistor to turn off switched buffer amplifier transistor 20. The Transfer period 60 begins at the low-to-high assertion of the XFR control signal, at which time storage capacitor 22 begins to charge through switched buffer amplifier transistor 20. A predetermined time after the end of the Photo Integration period 54 after the XFR control signal has been asserted, the Vref voltage line 18 is switched to a low potential such as ground (as shown in trace 62) and then the reset transistor 14 is turned on to pull the cathode of photodiode 12 and the gate of switched buffer amplifier transistor 20 to ground through reset transistor 14 and Vref line 18. Reset transistor 14 may be turned on in one of two ways. Either the Reset signal 16 is held at a potential above the threshold of the reset transistor 14 as is shown by the symbol ">Vth" in FIG. 3a, or it is switched to such a potential as is shown in FIG. 3b. This action terminates the charging of capacitor 22 and ends Transfer period 60. In either case, placing the low level of the RESET signal (trace 40) at a Vth above ground allows for an overflow drain for excess charge in bright pixels to accomplish antiblooming.

Figure 4:
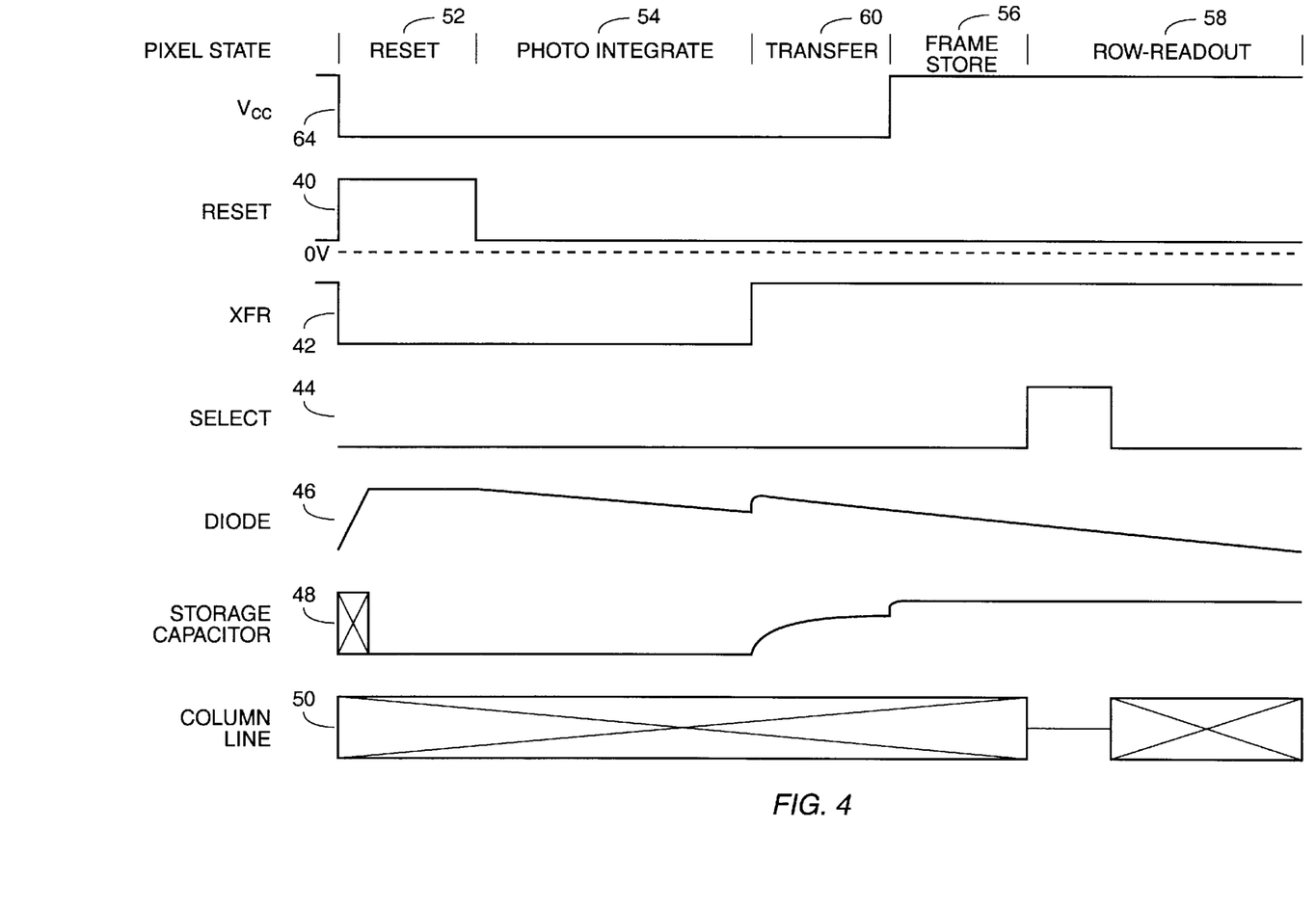
FIG. 4 is a timing diagram showing a second method for the operation of the storage-pixel sensor of FIG. 1 including the step of terminating the transfer period.

Referring now to FIG. 4, a timing diagram illustrates a second method for terminating the transfer process according to the present invention. According to this method, the source of switched buffer amplifier transistor 20 is pulled upward via capacitive coupling from a switched potential on the supply voltage Vcc line (trace 64) driving the drain of amplifier transistor 26. During the Reset period 52 and Photo Integration period 54, the Vcc line 28 is held at a low potential such as ground. A predetermined time after the end of the Photo Integration period 54, the Vcc line 28 is switched to a higher potential to allow the amplifier transistor 26 to function as a source follower. The rising voltage transition at Vcc 28 couples capacitively to the gate of transistor 26 and the storage-node plate of capacitor 22, thereby turning off switched buffer amplifier transistor 20. As described in copending application attorney Docket No. FOV-013, this method of switching the Vcc potential leads to improved readout gain and other advantages, and allows the gate capacitance of transistor 26 to serve as the storage capacitor, thereby removing the need for an explicit capacitor 22.

The Frame Store period 56 lasts until the Row Readout period 58 defined by the assertion of the SELECT signal (trace 44) to turn on N-Channel MOS select transistor 30 to place the output signal from the amplifier transistor 26 onto the column output line 32. As shown in trace 50 of FIGS. 2, 3a, 3b, and 4 the voltage on column output line 32 is only related to the signal in the pixel sensor under consideration during assertion of SELECT control signal 44. The SELECT signal asserted in trace 44 of FIG. 2 is common to all storage pixel sensors in the row of an array containing the storage pixel sensor 10. Persons of ordinary skill in the art will appreciate that the Frame Store period 56 will be different for pixel sensors in different rows in an array of storage pixel sensors according to the present invention, since the SELECT control signals for storage pixel sensors in different rows will occur at different times.

According to another embodiment of the present invention, the number of metal interconnect lines may be reduced by sharing the XFR and Vcc lines in the embodiment of FIG. 1 as indicated by the dashed connection at reference numeral 66. In this embodiment, a first method for operating the pixel sensor illustrated in FIG. 5a and includes the steps of 1) maintaining the combined Vcc/XFR line at a low voltage until the beginning of the Transfer period 60, and 2) pulling Vref low to cause the pixel sensor to enter the Frame Store period 56 (as in the method illustrated in FIGS. 3a and 3b). This action pulls the gate of the switched buffer amplifier transistor 20 low, thereby terminating any log-time rise of the voltage on storage capacitor 22 to remove that source of signal level uncertainty.

Figure 5A:
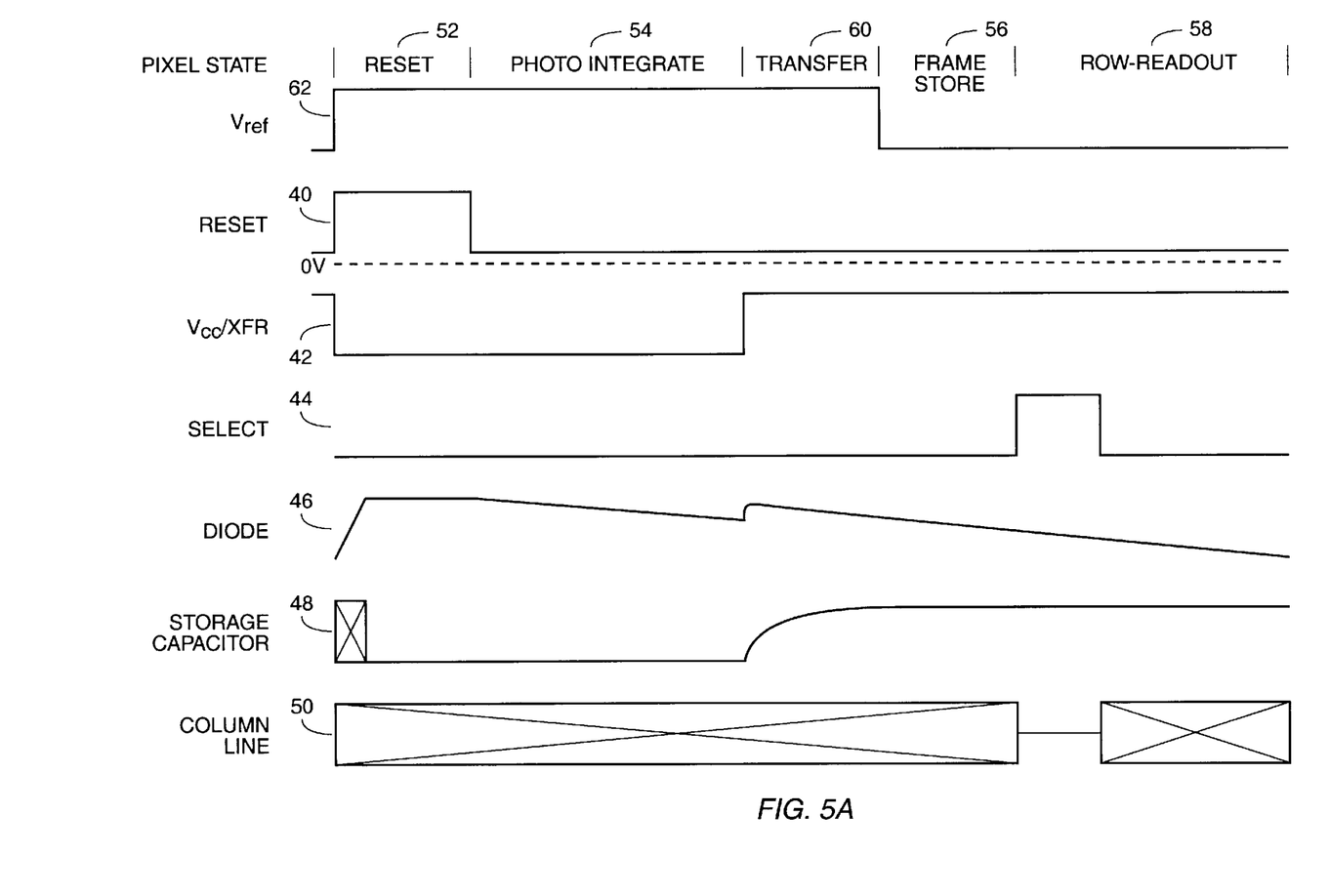
FIGS. 5a and 5b are timing diagrams showing two ways to implement a method for the operation of a storage-pixel sensor like that of FIG. 1 having a reduced number of metal interconnect lines including the step of terminating the transfer period.
Figure 5B:
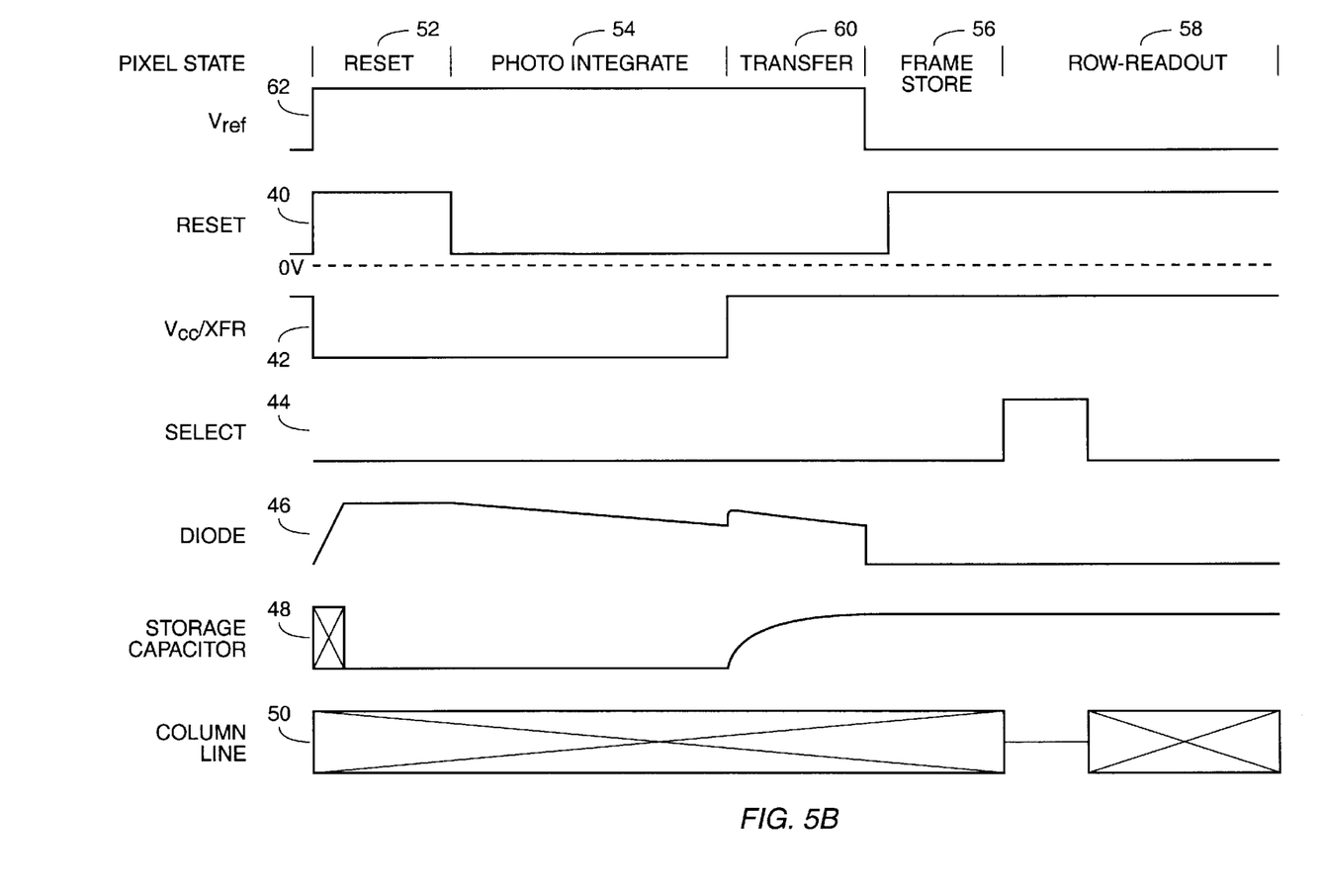

The method illustrated in FIG. 5b is the same as that shown in FIG. 5a except that the RESET control line 16 is pulled high during the Frame Store period after the Vref line has gone to a low level. This action pulls the cathode of the photodiode 12 to zero volts through reset transistor 14 to stop any change in the voltage at storage capacitor 22.

The storage pixel sensor 10 of FIG. 1 has the advantageous feature of utilizing a lower capacitance comprising the photodiode capacitance and the gate capacitance of the N-Channel MOS switched buffer amplifier transistor switch 20 during integration, and the larger capacitance of storage capacitor 22 during the storage period prior to readout. The smaller photodiode and transistor gate capacitance used during photocharge integration provides a relatively large voltage change in response to accumulated photocharge, but the circuit also provides a larger storage capacitance less susceptible to voltage droop as a result of leakage during the storage period prior to pixel data readout.

Illustrative embodiments of the present invention have been disclosed herein. More specifically, embodiments of the present invention employing N-channel MOS transistors have been disclosed. Persons of ordinary skill in the art will recognize that the present invention is not limited to these embodiments and that other equivalent embodiments of the invention are contemplated herein. For example, embodiments of the present invention employing P-channel MOS transistors will readily suggest themselves to persons of ordinary skill in the art from this disclosure. Such persons will readily contemplate the reversal of p-type and n-type materials, the reversal of anode and cathode connections of the photodiode, and the accompanying voltage polarity changes for such embodiments.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A storage pixel sensor comprising:
   a photosensor selectively connectable to a reset potential;
   a switched buffer amplifier having an input terminal coupled to said photosensor, a supply terminal coupled to a source of a transfer signal, and an output terminal;
   a storage capacitor coupled to said output terminal of said switched buffer amplifier; and
   an amplifier coupled to said storage capacitor.

2. A storage pixel sensor comprising:
   a photodiode having a first terminal coupled to a fixed potential and a second terminal;
   an MOS reset transistor coupled to said photodiode for selectively connecting said second terminal of said photodiode to a reset potential such that said photodiode is reverse biased;
   an MOS switched buffer amplifier transistor having a gate coupled to said photosensor, a first terminal connected to a source of a transfer signal, and a second terminal;
   a storage capacitor coupled to said second terminal of said switched buffer amplifier transistor; and
   an amplifier coupled to said storage capacitor.

3. The storage pixel sensor of claim 2 further including an MOS transistor select switch coupled between the output of said amplifier and a column output line.

4. A method for operating the storage pixel sensor of claim 3, including, in order, the steps of:
   (a) turning on the MOS reset transistor during a reset period;
   (b) integrating photocharge for a photo integration period following said reset period;
   (c) activating the transfer control signal for a frame store period following said photo integration period; and
   (d) turning on the MOS select transistor during a row-readout period following said frame store period.

5. The method of claim 4, further including the step of setting the reset control signal to an overflow drain level selected to cause said reset transistor to conduct after a predetermined amount of charge has accumulated on said photodiode during the time said reset control signal is at said overflow drain level.

6. A method for operating the storage pixel sensor of claim 3, including, in order, the steps of:

(a) turning on the MOS reset transistor during a reset period and raising the reset potential to a reset level;

(b) turning off said MOS reset transistor at the end of said reset period;

(c) integrating photocharge for a photo integration period following said reset period;

(d) activating the transfer control signal for a transfer period following said photo integration period;

(e) setting said reset potential to a level selected to discharge accumulated photocharge on the photodiode at the end of said transfer period; and (f) turning on the MOS select transistor during a row-readout period following said frame store period.

7. The method of claim 6 wherein step (b) comprises setting said reset control signal to an overflow drain level selected to cause said reset transistor to conduct after a predetermined amount of charge has accumulated on said photodiode during the time said reset control signal is at said overflow drain level.

8. A method for operating the storage pixel sensor of claim 3, including, in order, the steps of:

(a) turning on the MOS reset transistor during a reset period and raising the reset potential to a reset level;

(b) turning off said MOS reset transistor at the end of said reset period;

(c) integrating photocharge for a photo integration period following said reset period;

(d) activating the transfer control signal for a transfer period following said photo integration period;

(e) first setting said reset potential to a level selected to discharge accumulated charge on the photodiode and then turning on said MOS reset transistor at the end of said transfer period; and (f) turning on the MOS select transistor during a row-readout period following said frame store period.

9. The method of claim 8 wherein step (b) comprises setting said reset control signal to an overflow drain level selected to cause said reset transistor to conduct after a predetermined amount of charge has accumulated on said photodiode during the time said reset control signal is at said overflow drain level.

10. A method for operating the storage pixel sensor of claim 3, including, in order, the steps of:

(a) turning on the MOS reset transistor during a reset period, deactivating the supply potential, and raising the reset potential to a reset level;

(b) turning off the MOS reset transistor at the end of said reset period;

(c) integrating photocharge for a photo integration period following said reset period;

(d) activating the transfer control signal for a transfer period following said photo integration period;

(e) activating said supply potential at the end of said transfer period; and (f) turning on the MOS select transistor during a row-readout period following said frame store period.

11. The method of claim 10 wherein step (b) comprises setting said reset control signal to an overflow drain level selected to cause said reset transistor to conduct after a predetermined amount of charge has accumulated on said photodiode during the time said reset control signal is at said overflow drain level.

12. A method for operating the storage pixel sensor of claim 3, including, in order, the steps of:

(a) connecting said transfer signal source and said supply potential together to a global control signal source;

(b) deactivating said global control signal turning on the MOS reset transistor during a reset period and setting the reset potential to a reset level;

(c) turning off said MOS reset transistor at the end of said reset period;

(d) integrating photocharge for a photo integration period following said reset period;

(e) activating said global control signal at a transfer period following said photo integration period;

(f) setting said reset potential to a level selected to charge said photodiode beyond an overflow level at the end of said transfer period; and (g) maintaining said global control signal high for a row-readout period following said frame store period and turning on the MOS select transistor during said row-readout period.

13. The method of claim 12 wherein step (c) comprises setting said reset control signal to an overflow drain level selected to cause said reset transistor to conduct after a predetermined amount of charge has accumulated on said photodiode during the time said reset control signal is at said overflow drain level.

14. A method for operating the storage pixel sensor of claim 3, including, in order, the steps of:

(a) connecting said transfer signal source and said supply potential together to a global control signal source;

(b) deactivating said global control signal, turning on the MOS reset transistor during a reset period and setting the reset potential to a reset level;

(c) turning off said MOS reset transistor at the end of said reset period;

(d) integrating photocharge for a photo integration period following said reset period;

(e) activating said global control signal at a transfer period following said photo integration period;

(f) setting said reset potential to a level selected to charge said photodiode beyond an overflow level at the end of said transfer period and then turning on aid MOS reset transistor; and (g) maintaining said global control signal activated for a row-readout period following said frame store period and turning on the MOS select transistor during said row-readout period.

15. The method of claim 14 wherein step (c) comprises setting said reset control signal to an overflow drain level selected to cause said reset transistor to conduct after a predetermined amount of charge has accumulated on said photodiode during the time said reset control signal is at said overflow drain level.

16. A storage pixel sensor comprising:

a photodiode having an anode coupled to a fixed potential and a cathode;

an N-Channel MOS reset transistor having a source coupled to said photodiode, a drain coupled to a reset potential, and a gate connected to a source of a reset control signal;

an N-Channel MOS switched buffer amplifier transistor having a gate coupled to said photodiode cathode, a drain connected to a source of a transfer control signal, and a source;

a storage capacitor coupled between said source of said switched buffer amplifier transistor and a fixed potential; and an N-Channel MOS amplifier transistor having a gate coupled to said storage capacitor, a drain coupled to a supply potential, and a source.

17. The storage pixel sensor of claim 16, further including an N-Channel MOS select transistor having a drain connected to the source of said N-Channel MOS amplifier transistor, a source coupled to a column output line, and a gate connected to a source of a row select control signal.

18. A method for operating the storage pixel sensor of claim 17, including, in order, the steps of:

(a) raising the reset control signal high for a reset period;

(b) integrating photocharge for a photo integration period following said reset period;

(c) raising the transfer control signal high for a frame store period following said photo integration period; and (d) raising the select control signal high for a row-readout period following said frame store period.

19. The method of claim 18, further including the step of setting the reset control signal to an overflow drain level selected to cause said reset transistor to conduct after a predetermined amount of charge has accumulated on said photodiode during the time said reset control signal is at said overflow drain level.

20. A method for operating the storage pixel sensor of claim 17, including, in order, the steps of:

(a) raising the reset control signal to a high level during a reset period and raising the reset potential to a reset level;

(b) lowering said reset control signal at the end of said reset period;

(b) integrating photocharge for a photo integration period following said reset period;

(c) raising the transfer control signal high for a transfer period following said photo integration period;

(d) lowering said reset potential to a low level at the end of said transfer period; and (e) raising the select control signal high for a row-readout period following said frame store period.

21. The method of claim 20 wherein step (b) comprises lowering said reset control signal to an overflow drain level selected to cause said reset transistor to conduct after a predetermined amount of charge has accumulated on said photodiode during the time said reset control signal is at said overflow drain level.

22. A method for operating the storage pixel sensor of claim 17, including, in order, the steps of:

(a) raising the reset control signal to a high level during a reset period and raising the reset potential to a reset level;

(b) lowering said reset control signal level at the end of said reset period;

(c) integrating photocharge for a photo integration period following said reset period;

(d) raising the transfer control signal high for a transfer period following said photo integration period;

(e) first lowering said reset potential to a low level and then raising said reset control signal to a high level at the end of said transfer period; and (f) raising the select control signal high for a row-readout period following said frame store period.

23. The method of claim 22 wherein step (b) comprises lowering said reset control signal to an overflow drain level selected to cause said reset transistor to conduct after a predetermined amount of charge has accumulated on said photodiode during the time said reset control signal is at said overflow drain level.

24. A method for operating the storage pixel sensor of claim 17, including, in order, the steps of:

(a) raising the reset control signal to a high level during a reset period, lowering the supply potential to a low level, and raising the reset potential to a reset level;

(b) lowering said reset control signal at the end of said reset period;

(c) integrating photocharge for a photo integration period following said reset period;

(d) raising the transfer control signal high for a transfer period following said photo integration period;

(e) raising said supply potential to an operating level at the end of said transfer period; and (f) raising the select control signal high for a row-readout period following said frame store period.

25. The method of claim 24 wherein step (b) comprises lowering said reset control signal to an overflow drain level selected to cause said reset transistor to conduct after a predetermined amount of charge has accumulated on said photodiode during the time said reset control signal is at said overflow drain level.

26. A method for operating the storage pixel sensor of claim 17, including, in order, the steps of:

(a) connecting said transfer signal source and said supply potential together to a global control signal source;

(b) setting said global control signal low, raising the reset control signal high for a reset period and raising the reset potential to a reset level;

(c) lowering said reset control signal at the end of said reset period;

(d) integrating photocharge for a photo integration period following said reset period;

(e) raising said global control signal high at a transfer period following said photo integration period;

(f) lowering said reset potential at the end of said transfer period; and (g) maintaining said global control signal high for a row-readout period following said frame store period.

27. The method of claim 26 wherein step (c) comprises lowering said reset control signal to an overflow drain level selected to cause said reset transistor to conduct after a predetermined amount of charge has accumulated on said photodiode during the time said reset control signal is at said overflow drain level.

28. A method for operating the storage pixel sensor of claim 17, including, in order, the steps of:
   (a) connecting said transfer signal source and said supply potential together to a global control signal source;
   (b) setting said global control signal low, raising the reset control signal high for a reset period and raising the reset potential to a reset level;
   (c) lowering said reset control signal at the end of said reset period;
   (d) integrating photocharge for a photo integration period following said reset period;
   (e) raising said global control signal high at a transfer period following said photo integration period;
   (f) lowering said reset potential at the end of said transfer period and then raising said reset control signal high; and
   (g) maintaining said global control signal high for a row-readout period following said frame store period.

29. The method of claim 28 wherein step (c) comprises lowering said reset control signal to an overflow drain level selected to cause said reset transistor to conduct after a predetermined amount of charge has accumulated on said photodiode during the time said reset control signal is at said overflow drain level.

* * * * *